US 8,243,292 B2

(12) United States Patent
Qian

(10) Patent No.: US 8,243,292 B2
(45) Date of Patent: Aug. 14, 2012

(54) SYSTEMS AND METHODS FOR PRINTING ON RECYCLED MEDIA

(75) Inventor: Helen Hui Qian, San Jose, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 970 days.

(21) Appl. No.: 12/201,805

(22) Filed: Aug. 29, 2008

(65) Prior Publication Data
US 2010/0053663 A1 Mar. 4, 2010

(51) Int. Cl.
*G06F 3/12* (2006.01)
(52) U.S. Cl. ....... 358/1.12; 358/1.1; 358/1.13; 358/1.15
(58) Field of Classification Search ................... 358/1.1, 358/1.12, 1.13, 1.15; 347/171
See application file for complete search history.

(56) References Cited

U.S. PATENT DOCUMENTS

| 5,557,312 A * | 9/1996 | Sago .............................. 347/171 |
| 2003/0126316 A1* | 7/2003 | Parker ............................. 710/15 |
| 2004/0100016 A1* | 5/2004 | Lay et al. ....................... 271/225 |
| 2004/0252314 A1* | 12/2004 | Takahashi ...................... 358/1.1 |
| 2006/0204304 A1* | 9/2006 | Hioki et al. ..................... 400/76 |
| 2007/0109349 A1* | 5/2007 | Tanaka et al. .................. 347/37 |

* cited by examiner

*Primary Examiner* — King Poon
*Assistant Examiner* — Allen H Nguyen
(74) *Attorney, Agent, or Firm* — Finnegan, Henderson, Farabow, Garrett & Dunner, L.L.P.

(57) ABSTRACT

Apparatus, systems, and methods consistent with disclosed embodiments provide for managing the printing of documents using recycled media. In some embodiments, a printer comprises at least one input tray capable of holding print media; at least one image sensor capable of detecting recycled print media; and a print engine capable of placing marks on documents. The print media received from the input tray is routed to an output tray without marking by the print engine, if the image sensor detects recycled print media in the print media feed path during the processing of a non-recycled print; otherwise the print media is routed to a print engine on the printer.

18 Claims, 5 Drawing Sheets

SYSTEMS AND METHODS FOR PRINTING ON RECYCLED MEDIA

BACKGROUND

1. Field of the Invention

The present invention relates to the field of printers, and in particular to systems and methods for managing the printing of documents on recycled media.

2. Description of Related Art

Computer printers, which are ubiquitous in most modern organizations, permit the quick printing of stored documents. Designers of modern printers have focused relentlessly on improving printer speed, efficiency, color accuracy, and cost resulting in virtually universal adoption of printers. Nevertheless, in order to optimize resource usage, most organizations use a network of high speed printers to serve people in the organization. Because these high speed printers may be accessed seamlessly over computer networks, most users served by a high-speed network printer will experience very little or no delay when printing documents. In addition, networking allows the system to be fault tolerant and permits users to switch to other printers when a printer malfunctions or demands service.

With environmental consciousness growing, many organizations have adopted a "green culture" that encourages resource conservation while also promoting efficient resource utilization. Accordingly, many users now recycle paper and other print media that may contain various types of markings, including printed matter. For example, the blank reverse face of a paper sheet with printed matter on its obverse face may be used to print draft copies of documents. In some situations, such as where margins for a document are being adjusted, or minor formatting changes are being made, paper sheets with markings on both sides may also be used. In general, users may recycle media that has undergone prior printing in variety of ways according to the nature of the current print job. The ability to recycle media is typically limited only by the user's ingenuity.

However, the use of recycled paper creates issues in large organizations because print jobs using recycled media ("recycled print jobs") may be mixed with print jobs using new, unused, or non-recycled media ("non-recycled print jobs") on a single printer. The problem is compounded because users may inadvertently load recycled media into an input tray being used for new media. In such situations, a user may not realize that a portion of that user's non-recycled print job has been printed on unacceptable recycled material.

Many organizations have also eliminated the use of separator sheets for environmental reasons. Accordingly, it can be difficult to identify and separate jobs from various users without careful and time consuming perusal of documents in an output tray. For example, if two recycled print jobs print consecutively, it may be difficult for the users to determine where one job has ended and a next one has started.

Thus, there is a need for simple and efficient solutions that permit the seamless used of recycled media in modern printing environments.

SUMMARY

In accordance with disclosed embodiments, apparatus, systems, and methods for managing the printing of documents on recycled media are presented. In some embodiments, an apparatus for printing documents comprises at least one input tray capable of holding print media; at least one image sensor, the at least one image sensor capable of detecting recycled print media; a print engine capable of placing marks on documents; wherein print media received from the input tray is routed to an output tray without marking, if the image sensor detects recycled print media in the print media feed path during the processing of a non-recycled print; and wherein print media received from the input tray is routed to a print engine otherwise.

Embodiments disclosed also pertain to systems and methods for managing the printing of documents on recycled media and to program instructions embodied in computer-readable media. These and other embodiments are further explained below with respect to the following figures.

DETAILED DESCRIPTION

In accordance with the present invention, systems and methods for securely printing documents are presented.

Figure 1:
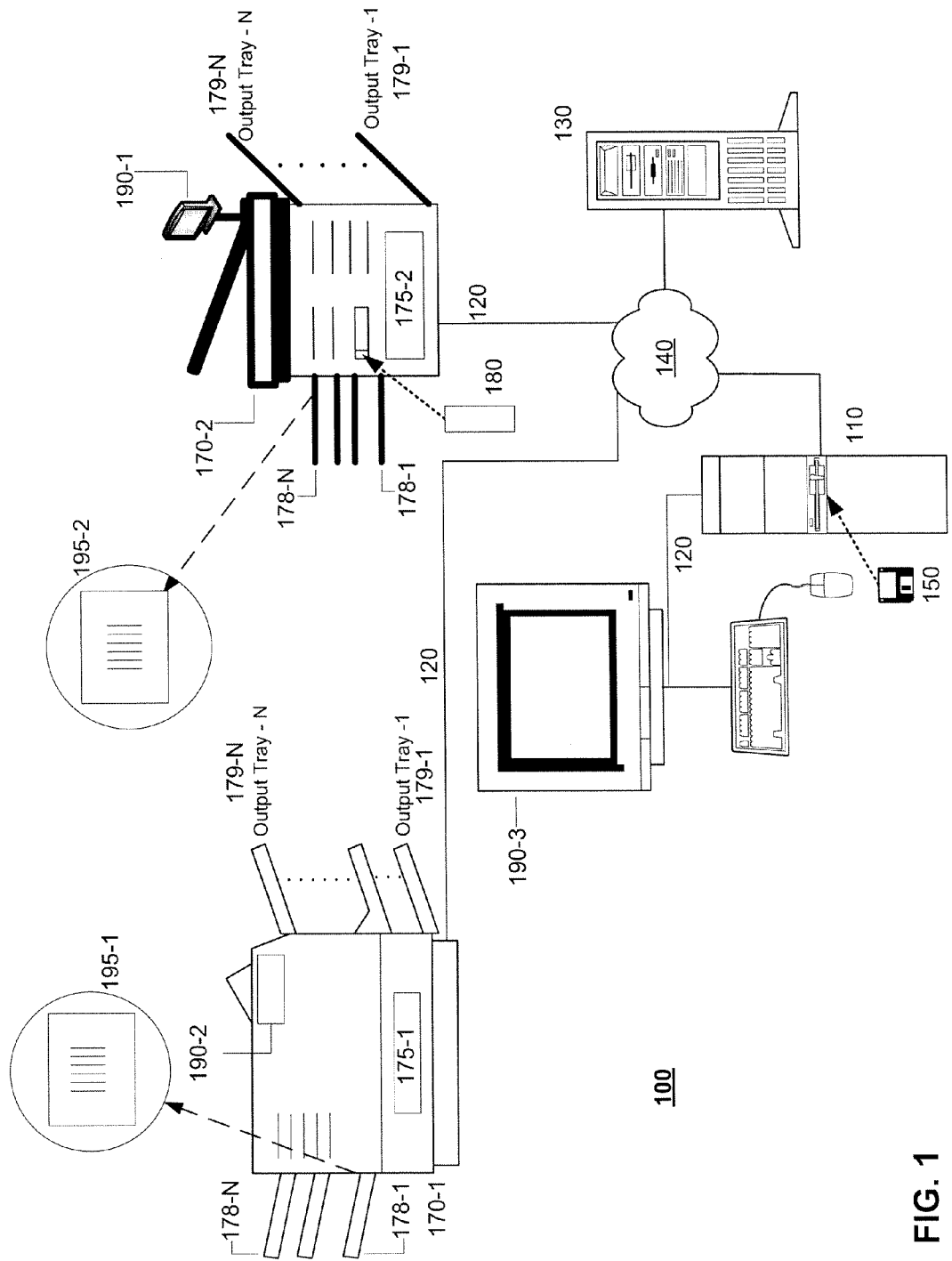
FIG. 1 shows a block diagram of a system for managing the printing of documents on recycled media.

FIG. 1 shows a block diagram of exemplary system 100 for managing printing systems using recycled media. A computer software application consistent with the present invention may be deployed on a network of computers and/or printers, as shown in FIG. 1, that are connected through communication links that allow information to be exchanged using conventional communication protocols and/or data port interfaces.

As shown in FIG. 1, exemplary system 100 includes a computer or computing device 110 and a server 130. Further, computing device 110 and server 130 may communicate over a connection 120, which may pass through network 140, which in one case could be the Internet. Computing device 110 may be a computer workstation, desktop computer, laptop computer, or any other computing device capable of being used in a networked environment. Server 130 may be a platform capable of connecting to computing device 110 and other devices too (not shown). Computing device 110 and server 130 may be capable of executing software (not shown) that allows printing of documents on printers 170-1 and 170-2 using recycled and/or non-recycled media.

Printers 170 may be laser printers, ink jet printers, LED printers, plotters, multi-function devices, or other devices that are capable of printing documents. Computing device 110 may contain a removable media drive 150. Removable media drive 150 may include, for example, 3.5 inch floppy drive, CD-ROM drives, DVD ROM drives, CD±RW or DVD±RW drives, USB flash drives, and/or any other removable media drives consistent with embodiments of the present invention. Portions of software applications may reside on removable media and be read and executed by computing device 110 using removable media drive 150. In some embodiments, intermediate and final results and/or reports generated by applications may also be stored on removable media.

Connection 120 couples computing device 110, server 130, and printers 170 and may be implemented as a wired or wireless connection using conventional communication protocols and/or data port interfaces. In general, connection 120 can be any communication channel that allows transmission of data between the devices. In one embodiment, for example, the devices may be provided with conventional data ports, such as USB™, SCSI, FIREWIRE™, and/or BNC ports for transmission of data through the appropriate connection 120. The communication links could be wireless links or wired links or any combination that allows communication between computing device 110, server 130, and printers 170.

Network 140 could include a Local Area Network (LAN), a Wide Area Network (WAN), or the Internet. Exemplary printer 170-2, may be a network printer, and can be connected to network 140 through connection 120. System 100 may include multiple printers 170 and other peripherals (not shown), according to embodiments of the invention. Printers 170 may be controlled by hardware, firmware, or software, or some combination thereof. Printers 170 may include one or more print controller boards 175, such as exemplary print controllers 175-1 and 175-2, which may control the operation of printers 170. Printers 170 may be controlled by firmware or software resident on memory devices in print controllers 175. In general, print controllers 175 may be internal or external to printers 170. In some embodiments, printers 170 may also be controlled in part by software, including print servers, printer drivers, or other software, running on computing device 110 or server 120.

Printers, such as exemplary printers 170, may also include consoles 190 such as consoles 190-1 and 190-2, or other interfaces to allow configuration options to be set, passwords and/or user identification and authentication information to be entered, and other messages to be displayed. In some embodiments, configuration options may be set or displayed using a display or user-interface on a monitor for a computer coupled to printers 170. For example, user interfaces to set one or more configuration options on printer 170-1 may be displayed on monitor 190-3, which is coupled to computer 110. A user interface to set configuration options on printer 170-2 may also be displayed on monitor 190-3, using software running on server 130.

In some embodiments, configuration parameters pertaining to printer 170 may be user-configurable. For example, the print resolution, document sizes, color options, and other configuration parameters may be user-configurable. Users may also be able to log into a printer 170 to perform administrative functions such as to enable software or firmware on printer 170 to perform various functions. In some embodiments, the log in process may require a password or other user-authentication mechanism.

A user may also be able to specify input trays 178 and/or output trays 179 and the use of automatic document feeders to allow batch processing of documents. Printers 170 may have multiple input trays 178 and/or output trays 179. Output trays 179 can hold printed documents that have been processed by a printer. In some embodiments, input trays 178 may contain recycled print media and/or non-recycled print media. Similarly, output trays 179 may hold some combination recycled print media and non-recycled print media.

In some embodiments, one or more input trays 178 on printers 170 may be coupled to image sensors 195. For example, image sensors 195-1 and 195-2 are coupled to input tray 178-1 on printer 170-1, and input tray 178-N on printer 170-2, respectively. In some embodiments, each input tray on printers 170 may have an image sensor 195. Image sensors 195 can detect images present on print media in the input trays. In one embodiment, exemplary image sensor 195 may take the form of a line sensor or an optical sensor capable of detecting markings on both faces or either face of each print media in an input tray 178 of printer 170. Image sensors 195 may provide user-configurable options. For example, image sensors 195 may be turned on or off. In some embodiments, the sensitivity of image sensors 195 may be adjusted. In some embodiments, if either face of a print media sheet in an input tray contains an image then control mechanisms on the printer may be notified that the sheet is recycled media. In some embodiments, one input tray may be designated as a non-recycled media tray. In general, the number of such specially designated input trays 178 may be varied depending on the typical job mix. For example, if the vast majority of documents that are printed are draft copies then one special input tray to hold non-recycled media may be adequate. If the number of final or non-draft copies is greater, then additional trays may be designated as special input trays to hold non-recycled media.

In some embodiments, image sensor 195 may flag an error condition if recycled print media is introduced into an input tray that has been designated for non-recycled print media. In some embodiments, interrupts may be generated by image sensor 195 to other components or functional blocks in printer 170 when specific conditions are detected. In some embodiments, image sensor 195 may be placed at an appropriate location in the paper feed or print media feed path so that recycled media from any input paper tray 178 may be detected.

In some embodiments, an output tray 179 may be designated as a special tray and used to hold recycled print media that has not been marked by printer 170. For example, in one embodiment, when recycled sheets are intermingled with non-recycled sheets and the print job being processed by printer 170 specifies the use of non-recycled print media, then any sheets that are identified as recycled sheets by image sensor 195 may be routed to the special output tray without being marked by printer 170. In some embodiments, the special output tray 179 may be a side tray. Routing recycled sheets that have not been marked by printer 170 to a special output tray 179 prevents users from confusing them with recycled print jobs.

A computer software application consistent with the present invention may be deployed on any of the exemplary computers, or printers as shown in FIG. 1. For example, computing device 110 could execute software, such as a user interface coupled to a print driver, to allow users to configure, control, and/or monitor the operation of printer 170-1. An independent application may also execute concurrently on printer 170-2 based on its configuration. In another example, an application resident on print controller 175-1 could be configured using computer 110 but execute on printer 170-1. In general, applications may execute in whole or in part on one or more computers, print controllers, or printers in the system. The embodiments described above are exemplary only and other embodiments and implementations will be apparent to one of reasonable skill in the art.

Figure 2:
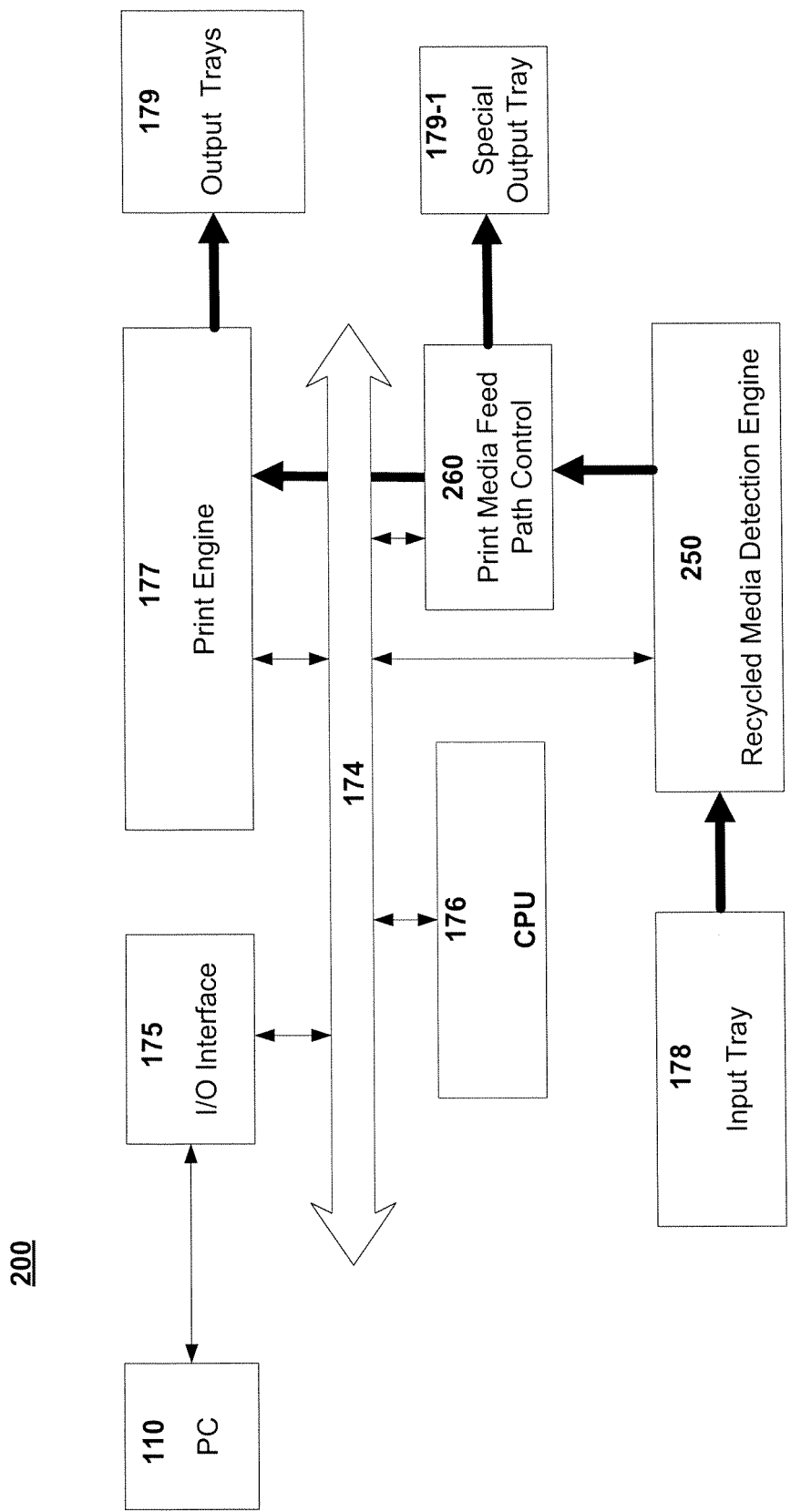
FIG. 2 shows a block diagram illustrating components of an exemplary printer for managing the printing of documents in systems using recycled media.

FIG. 2 shows a block diagram illustrating components of an exemplary printer for managing the printing of documents in systems using recycled media. For simplicity, only the major blocks, connections, and couplings have been indicated in FIG. 2. In FIG. 2, the dark arrows of heavier weight indicate various print media feed paths, or paper feed paths, from input tray(s) 178 to output tray(s) 179.

In some embodiments, printer 170 may contain bus 174 that couples Central Processing Unit ("CPU") 176, input-output ("I/O") interface 175, print engine 177, and recycled paper detection engine 250. Printer 170 may also contain other devices such as firmware, ROM, memory (RAM), secondary storage, Application Specific Integrated Circuits ("ASIC"s), and/or Field Programmable Gate Arrays ("FPGA"s) (not shown) that are capable of executing portions of an application to manage the printing of documents according to disclosed embodiments.

In some embodiments, printer 170 may also be able to access secondary storage or other memory in computing device 110 using I/O interface 175 and connection 120. In some embodiments, printer 170 may also be capable of executing software including a printer operating system and other appropriate application software. In some embodiments, printer 170 may allow paper sizes, input trays 178 output trays 179, recycled paper options, color selections, and print resolution, among other options, to be user-configurable.

In some embodiments, CPU 176 may be a general-purpose processor, a special purpose processor, a Micro Control Unit ("MCU"), or an embedded processor. CPU 176 can exchange data including control information and instructions with I/O interface 175, print engine 177, and recycled media detection engine 250. CPU 176 may execute instructions and routine stored in firmware including but not limited to a boot-up sequence, pre-defined routines, memory management routines, and other code. In some embodiments, code and data in firmware may be copied to memory prior to being acted upon by CPU 176. In some embodiments, firmware 171 may include routines to manage recycled print media. In some embodiments, data and instructions in firmware 171 may be upgradeable. In some embodiments, CPU 176 may act upon instructions and data and provide control and data to print engine 177 to generate printed documents.

Exemplary I/O interface 175 receives data from computing device 110, which may be a personal computer. In some embodiments, I/O interface 175 may receive data from computing device over a network connection. The data may be placed on bus 174, where it may be processed by CPU 176. When data is ready for printing, CPU 176 may initiate the process of placing marks on a print medium by sending an appropriate notification to print engine 177. Based on the configuration of printer 170 and/or instructions contained in the print job, print media may be obtained from an appropriate input tray 178. For example, if an input tray 178 has been specified as a non-recycled media tray and job attributes indicate that the print job is a non-recycled print job, then media may be obtained from the specially designated input tray 178 for printing. If no tray has been specially designated then media may be obtained from any appropriate input tray based on print job and printer configuration.

Media obtained from an input tray may be scanned by image sensor 195, which may be coupled to input trays 178. Recycled media detection engine 250 may use input provided by the image sensors 195 to determine if print media that is being currently processed is non-recycled or recycled and take appropriate action based on the print job settings and media type. In general recycled media detection engine 250 may be implemented by hardware, software, firmware, or some combination thereof.

In some embodiments, recycled media detection engine 250 may communicate with print media feed path control 260 and/or print engine 177 either directly or through bus 174 to take appropriate action. For example, if the print job settings permit the use of recycled media then media can be routed to print engine 177 for marking and then sent to one of output trays 179. As a further example, if print job settings specify non-recycled media, then any recycled sheets detected by image sensor 195 may be routed to a special output tray 179 without being marked or acted upon by print engine 177. Print media feed path control 260 may control feed path and permit print media to be routed to various printer components in a timely manner during the processing of a print job. In some embodiments, print media feed path control 260 may send and receive control, commands, status, and data from CPU 176, recycled media detection engine 250, and print engine 177.

In some embodiments, the special output tray holds recycled media that have not been acted upon by print engine 177 and therefore can be reused. In some embodiments, print engine 177 may place special markings on a specified location (such as a margin) on the first page of recycled media print jobs to facilitate identification of individual jobs printed on recycled media. In some embodiments, distinct print jobs may be collated on an output tray 179. For example, the output of a recycled print job may be offset from the previous job to facilitate identification. Further, the output from distinct print jobs may also be routed to distinct output trays 179.

In some embodiments, a user-interface associated with a document processing program, print driver, or other software may be provided to facilitate printer 170 and print job configuration settings pertaining to recycled and non-recycled media, and/or user-configuration options available for image sensor 195. In some embodiments, all jobs may have a default setting that the user may change prior to printing. In some embodiments, the default settings may be individualized and stored as part of the user profile. In some embodiments, profiles may be associated with printers, so that print jobs sent to the printer will print according to the profile unless changed by a user, or through job settings.

Figure 3:
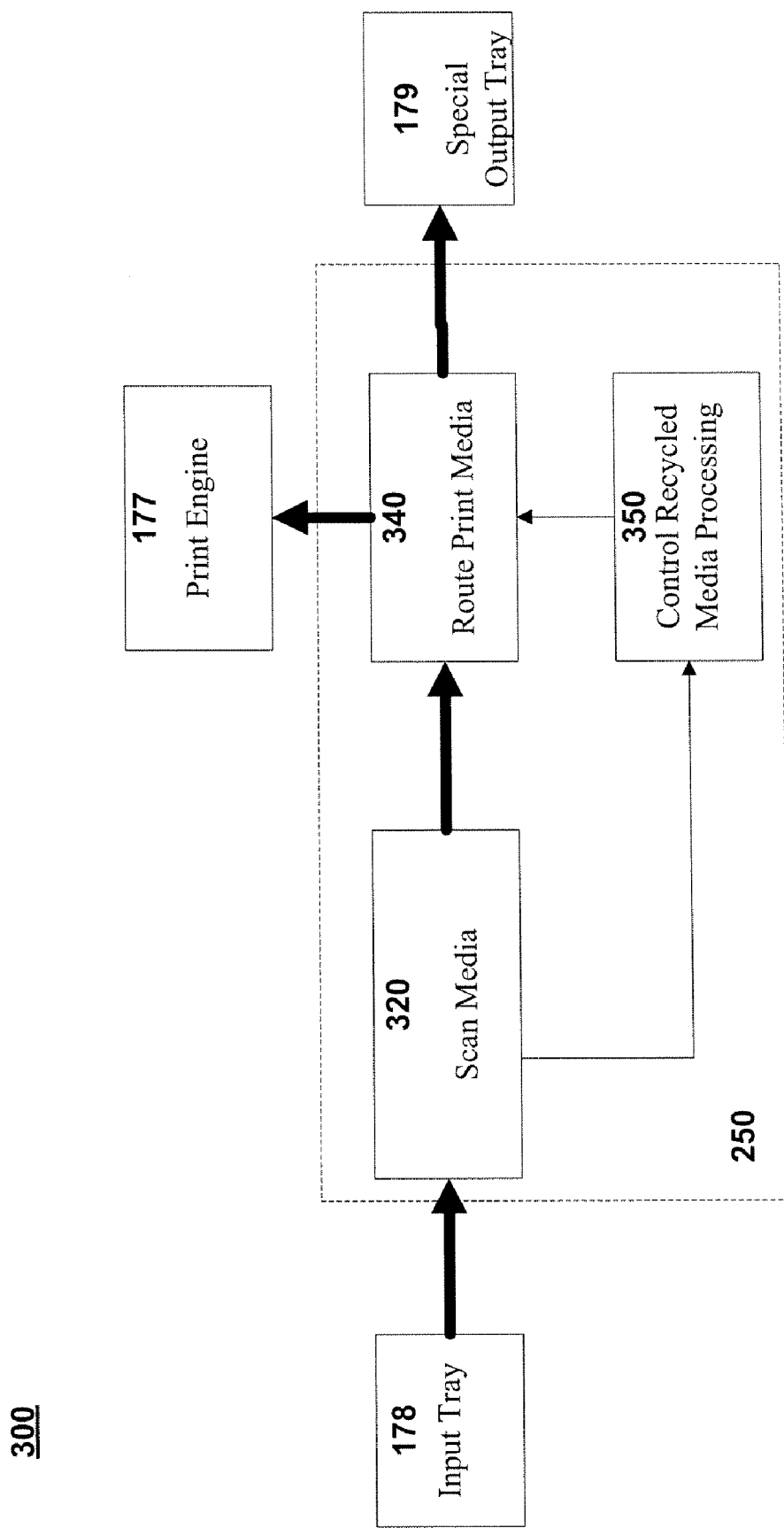
FIG. 3 depicts a diagram 300 of an exemplary process flow illustrating the interaction of functional blocks with components used for managing the printing of documents in systems using recycled media.

FIG. 3 depicts a diagram 300 of an exemplary process flow illustrating the interaction of functional blocks with components used for managing the printing of documents in systems using recycled media. In FIG. 3, the dark arrows of heavier weight indicate the functional blocks that lie on the print media path from input tray(s) 178 to output tray(s) 179. In some embodiments, print media in input tray 178 may be scanned in scan media block 320 to determine whether the media is recycled or non-recycled. In one embodiment, scanning may be performed by image sensor 195, which may be coupled to input tray 195 and functional block control recycled media processing 350. In one embodiment, the functions described in functional blocks 320, 340, and 350 may be performed by recycled media detection engine 250.

If the input to control recycled media processing block 350 indicates that the print media is non-recycled, then control recycled media processing block 350 may direct route print media block 340 to route the media to print engine 177. Similarly, if the input to control recycled media processing block 350 indicates that the print media is recycled, then control recycled media processing block 350 may direct route print media block 340 to route the media to print engine 177, if the print jobs permits the use of recycled media. On the other hand, if the input to control recycled media processing block 350 indicates that the print media is recycled and the print job does not permit the use of recycled media, then control recycled media processing block 350 may direct route print media block 340 to route the media to special output tray 179. In some embodiments, route print media block 340 may route all print media by default to print engine 177 and control recycled media processing block 350 may intervene when it determines that a change in routing is appropriate.

Figure 4:
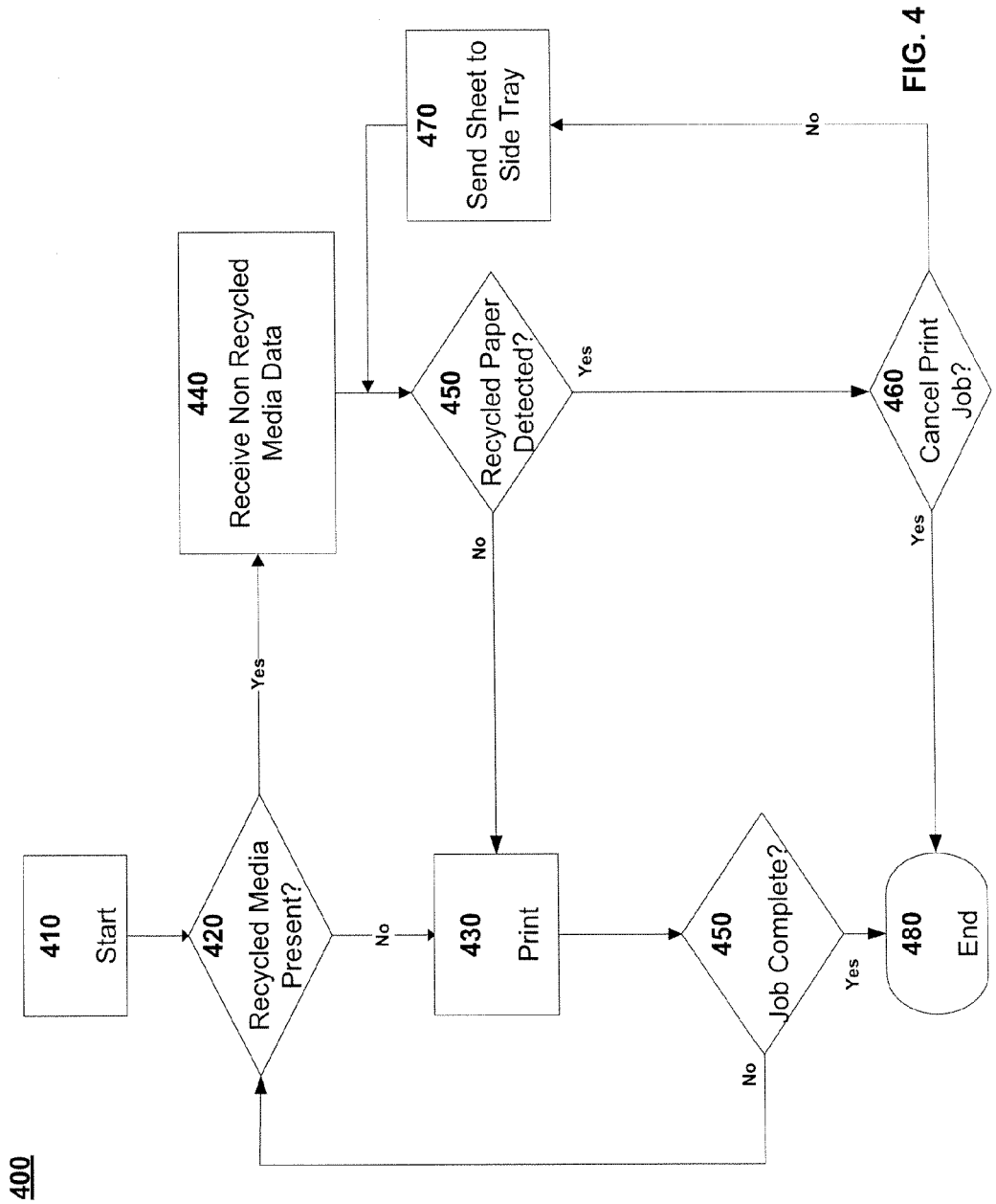
FIG. 4 shows a flowchart depicting an exemplary method 400 for managing the printing of non-recycled print jobs in systems using recycled media.

FIG. 4 shows a flowchart depicting an exemplary method 400 for managing the printing of non-recycled print jobs in systems using recycled media. The algorithm commences in step 410. In step 420, the algorithm may determine if recycled media is present. In some embodiments, the determination may be made based on input provided by image sensor 195. In some embodiments, the algorithm may check the configuration of printer 170 to determine if it has been set to print recycled media. For example, in some organizations, printers 170 dedicated to certain functions may be used exclusively to print "final" versions of documents and may not use recycled media. Accordingly, if printer 170 is configured exclusively for non-recycled media then print jobs may be printed directly in step 430.

If recycled media is present, then print data can be received in step 440. Next, in step 450, the algorithm may determine if media currently in the paper path is recycled. If the media is non-recycled, then the algorithm proceeds to step 430 where the current sheet can be printed.

If the media is recycled, the algorithm may determine if the job can be canceled in step 460. In some embodiments, such as in situations where a printer may have a single output tray 179, a user may prefer to cancel a print job when recycled media is present in order to prevent the intermingling of recycled sheets and non-recycled sheets when the non-recycled media print job is printed. In step 460, the print job may be canceled, if specified in the print job for situations where recycled media is present.

If the user has elected to proceed with printing when recycled media is present then, in step 470, the current recycled medium may be sent without further processing to output tray 179, which in some instances may be a specially designated output tray. The algorithm then iterates through steps 430-470 until the print job is complete, and may eventually terminate in step 480.

Figure 5:
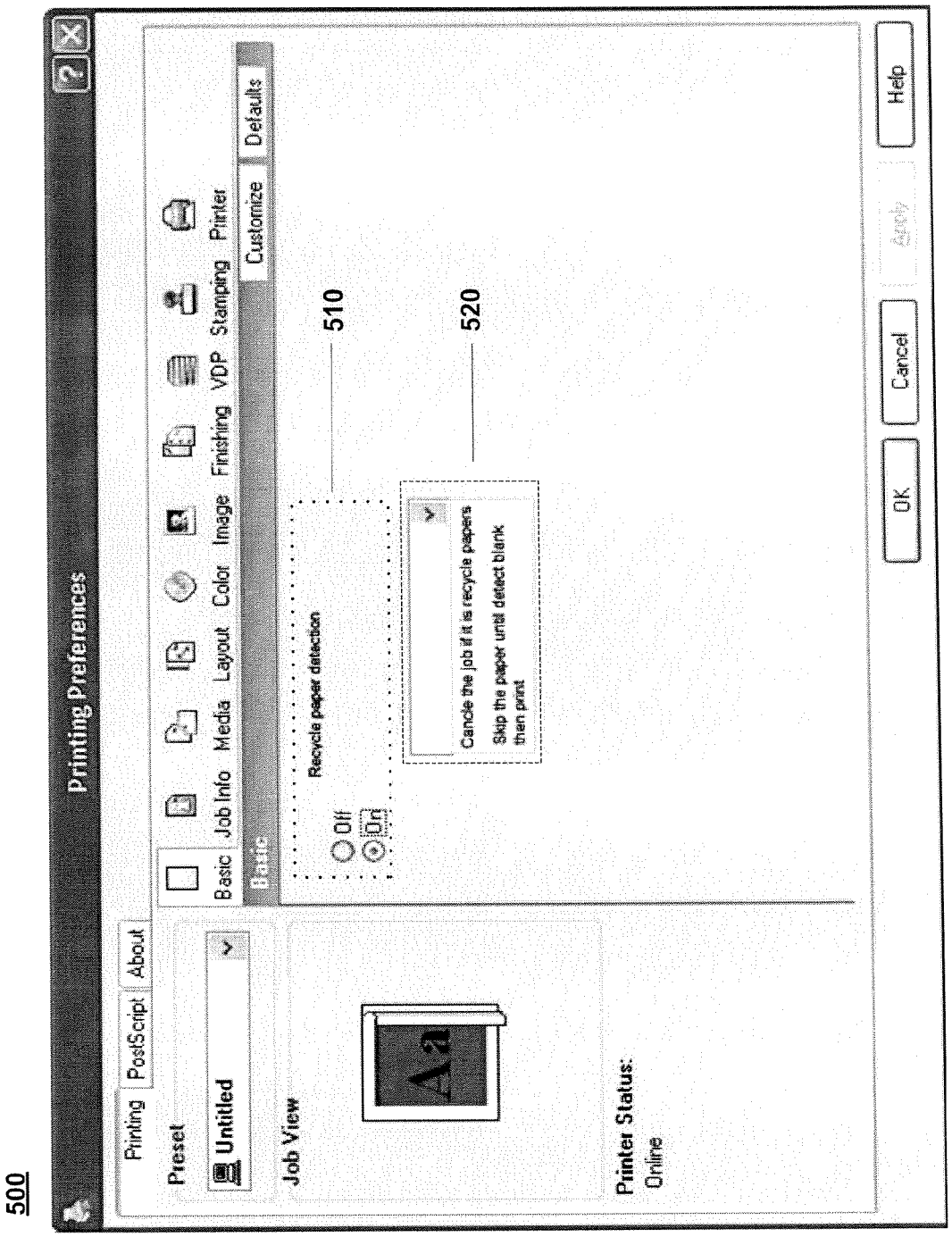
FIG. 5 shows an exemplary user interface 500 with user configurable options for managing the printing of documents in systems using recycled media.

FIG. 5 shows an exemplary user interface 500 with user configurable options for managing the printing of documents in systems using recycled media. In some embodiments, user interface 500 may be presented as part of a "Print" menu in document processing software. In some embodiments, user interface 500 may be presented as part of a "Printing Preferences" menu in software associated with a print driver.

As shown in FIG. 5, user interface 500 may provide recycled media options 510 to turn recycled media detection "on" or "off". If recycled media detection has been turned off, then all media will be treated as non-recycled and printing proceeds in a conventional manner. If recycle media detection has been turned on, then image scanner 195 and recycled media detection engine 250 may be enabled and recycled media may be detected and processed in accordance with disclosed embodiments.

In some embodiments, pull down menu 520 may allow the user to set additional options such as canceling a print job if recycled media is present, or permitting recycled media to be sent to an output tray until non-recycled media is detected when a non-recycled media job is being processed. Other options may also be provided to a user through user interface 500, such as permitting the designation of special input and output trays, configuring the sensitivity of image scanner 195, and/or setting other user-configurable options for the image scanner.

Further, methods consistent with disclosed embodiments may conveniently be implemented using program modules, hardware modules, or a combination of program and hardware modules. Such modules, when executed, may perform the steps and features disclosed herein, including those disclosed with reference to the exemplary flow charts shown in the figures. The operations, stages, and procedures described above and illustrated in the accompanying drawings are sufficiently disclosed to permit one of ordinary skill in the art to practice the invention. Moreover, there are many computers and operating systems that may be used in practicing embodiments of the instant invention and, therefore, no detailed computer program could be provided that would be applicable to these many different systems. Each user of a particular computer will be aware of the language, hardware, and tools that are most useful for that user's needs and purposes.

The above-noted features and aspects may be implemented in various environments. Such environments and related applications may be specially constructed for performing the various processes and operations of the invention, or they may include a general-purpose computer or computing platform selectively activated or reconfigured by program code to provide the functionality. The processes disclosed herein are not inherently related to any particular computer or other apparatus, and aspects of these processes may be implemented by any suitable combination of hardware, software, and/or firmware.

Embodiments disclosed also relate to compute-readable media and/or memory that include program instructions or program code for performing various computer-implemented operations based on the methods and processes of embodiments of the invention. The program instructions may be those specially designed and constructed, or they may be of the kind well known and available to those having skill in the computer arts. Examples of program instructions include, for example, machine code, such as produced by a compiler, and files containing a high-level code that can be executed by the computer using an interpreter.

Other embodiments of the invention will be apparent to those skilled in the art from consideration of the specification and practice of the embodiments of the invention disclosed herein. It is intended that the specification and examples be considered as exemplary only, with a true scope and spirit of the invention being indicated by the following claims. As such, the invention is limited only by the following claims.

The invention claimed is:

1. A printer comprising:
at least one input tray capable of holding print media;
at least one image sensor, the at least one image sensor capable of detecting recycled print media;
a print engine capable of placing marks on documents;
wherein print media received from the input tray is routed to an output tray without marking by the print engine, if the image sensor detects recycled print media in the print media feed path during the processing of a non-recycled print job; and
wherein print media received from the input tray is routed to a print engine, if the image sensor does not detect recycled print media in the print media feed path during the processing of the non-recycled print job.

2. The printer of claim 1, wherein the at least one image sensor is located on the print media feed path.

3. The printer of claim 2, wherein the at least one image sensor is coupled to the input tray.

4. The printer of claim 1, wherein the at least one image sensor is capable of detecting markings on both faces of the print media.

5. The printer of claim 1, wherein the at least one image sensor is user-configurable.

6. The printer of claim 5, wherein the user-configurable options include disabling recycled print media detection.

7. The printer of claim 5, wherein the user-configurable options include canceling the print job, if recycled media is detected during a non-recycled print job.

8. The printer of claim 5, wherein the user-configurable options are presented using a user-interface associated with a print driver for the printer.

9. The printer of claim 1, wherein the output tray is specially designated to hold unmarked recycled print media.

10. The printer of claim 5, wherein the user-configurable options are specified using a user-profile associated with a user account.

11. A method for managing the printing of documents on a printer comprising:
routing recycled print media without marking by a print engine to an output tray coupled to the printer, if recycled print media is detected in the print media feed path of the printer during the processing of a non-recycled print job; and
routing print media to the print engine on the printer otherwise;
wherein routing recycled print media without marking to an output tray coupled to the printer, if recycled print media is detected in the print media feed path of the printer during the processing of a non-recycled print job further comprises canceling the non-recycled print job.

12. The method of claim 11, wherein the output tray is specially designated to hold unmarked recycled print media.

13. The method of claim 11, wherein recycled print media is detected using an image sensor coupled to the printer.

14. The method of claim 11, wherein the method is enabled through a user-interface associated with a print driver for the printer.

15. A non-transitory computer-readable medium that stores instructions, which when executed by a computer performs steps in a method for managing the printing of documents on a printer, the method comprising:
routing recycled print media without marking by a print engine to an output tray coupled to the printer, if recycled print media is detected in the print media feed path of the printer during the processing of a non-recycled print job; and
routing print media to the print engine on the printer, if recycled print media is not detected in the print media feed path of the printer during the processing of the non-recycled print job;
wherein routing recycled print media without marking to an output tray coupled to the printer, if recycled print media is detected in the print media feed path of the printer during the processing of a non-recycled print job further comprises canceling the non-recycled print job.

16. The non-transitory computer-readable medium of claim 15, wherein the output tray is specially designated to hold unmarked recycled print media.

17. The non-transitory computer-readable medium of claim 15, wherein recycled print media is detected using an image sensor coupled to the printer.

18. The non-transitory computer-readable medium of claim 15, wherein the method is enabled through a user-interface associated with a print driver for the printer.

* * * * *